US012673704B2

(12) United States Patent
Huang et al.

(10) Patent No.: US 12,673,704 B2
(45) Date of Patent: Jul. 7, 2026

(54) SYSTEM AND METHOD FOR MOVER SELF-NAVIGATION IN AN INDEPENDENT CART SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US); Peter Eric Malkowski, Lancaster, MA (US); Jatin P. Bhatt, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 996 days.

(21) Appl. No.: 17/889,069

(22) Filed: Aug. 16, 2022

(65) Prior Publication Data

US 2024/0059327 A1 Feb. 22, 2024

(51) Int. Cl.
| | |
|---|---|
| *B61B 13/00* | (2006.01) |
| *B61L 1/02* | (2006.01) |
| *B61L 25/04* | (2006.01) |
| *B61L 27/04* | (2006.01) |
| *B65G 54/02* | (2006.01) |

(52) U.S. Cl.
CPC ............... *B61B 13/00* (2013.01); *B61L 1/02* (2013.01); *B61L 25/04* (2013.01); *B61L 27/04* (2013.01); *B65G 54/02* (2013.01)

(58) Field of Classification Search
CPC . B61B 13/00; B61L 1/02; B61L 25/04; B61L 27/04; B61L 11/08; B65G 54/02; G05B 19/4183; G05B 2219/31312; G05B 19/41865; G05B 19/4189
See application file for complete search history.

(56) References Cited

U.S. PATENT DOCUMENTS

| | | | | |
|---|---|---|---|---|
| 6,240,335 | B1 * | 5/2001 | Wehrung | ........... G05B 19/4189 |
| | | | | 198/577 |
| 8,616,134 | B2 * | 12/2013 | King | ...................... B65G 35/06 |
| | | | | 104/284 |
| 9,505,560 | B2 * | 11/2016 | Kleinikkink | ......... G05B 19/414 |
| 10,587,212 | B1 * | 3/2020 | Van Dorpe | ............ H02K 11/30 |
| 10,717,365 | B2 | 7/2020 | Huang et al. | |
| 10,720,864 | B2 * | 7/2020 | Huang | ................... H02K 11/35 |

(Continued)

FOREIGN PATENT DOCUMENTS

| | | |
|---|---|---|
| EP | 3501880 B1 | 11/2021 |
| WO | 00/35782 A2 | 6/2000 |
| WO | 2022063848 A1 | 3/2022 |

OTHER PUBLICATIONS

Extended European Search Report for Application No. 23183298.1 dated Apr. 25, 2024 (15 pages).

*Primary Examiner* — Michael Collins

(74) *Attorney, Agent, or Firm* — Boyle Fredrickson, SC

(57) ABSTRACT

A system for controlling movers in a linear drive system includes a plurality of movers and a track providing segments along which the movers may travel and holding driver coils and a segment controller controlling the driver coils. Some of the segments having switches forming branches between segments. A central controller communicates operates with the segment controllers to route the movers along the track by distributing routing decisions for a given mover to a segment controller for a track on which a given mover is currently traveling.

20 Claims, 3 Drawing Sheets

(56)          References Cited

U.S. PATENT DOCUMENTS

| | | | |
|---|---|---|---|
| 10,985,685 | B1 | 4/2021 | Sun et al. |
| 11,190,086 | B2 | 11/2021 | Grosskreuz et al. |
| 11,599,101 | B2 * | 3/2023 | Huang ................. G05B 19/416 |
| 11,643,120 | B2 * | 5/2023 | Cooper ..................... B61C 3/00 |
| | | | 701/19 |
| 11,826,667 | B1 * | 11/2023 | Tinsley ................... B61G 5/02 |
| 2005/0065642 | A1 * | 3/2005 | Brixius ................. B65G 47/50 |
| | | | 198/348 |
| 2008/0123111 | A1 | 5/2008 | Hori |
| 2019/0084781 | A1 * | 3/2019 | Huang ................... B60L 13/03 |
| 2020/0148240 | A1 * | 5/2020 | Desotelle ............... B61B 13/08 |
| 2020/0379439 | A1 | 12/2020 | Klein, II |
| 2021/0213984 | A1 | 7/2021 | Cooper et al. |

* cited by examiner

SYSTEM AND METHOD FOR MOVER SELF-NAVIGATION IN AN INDEPENDENT CART SYSTEM

BACKGROUND INFORMATION

The present invention relates to motion control systems and, more specifically, to providing improved navigation of movers in an independent cart system.

Motion control systems utilizing movers and linear drives in an independent cart system can be used in a wide variety of processes (e.g., packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track.

The track is made up of a number of track segments that, in turn, hold individually controllable electric coils. Successive activation of the coils establishes a moving electromagnetic field that interacts with magnets or similar structures on the movers and causes the mover to travel along the track in the manner of a linear electric motor. Each of the movers may be independently moved and positioned along the track in response to the moving electromagnetic field generated by the coils. Each track segment may have a separate controller that handles the low level sequencing of the coils in response to instructions from a central controller.

In a simple system, the track forms a path over which each mover circulates. At certain destinations along the track other actuators may interact with each mover. For example, the mover may pass or stop at a loading station at which a first actuator places a product on the mover. The mover may then be moved along a process segment of the track where various other actuators may fill, machine, position, or otherwise interact with the product on the mover. The mover may be programmed to stop at various destinations or to move at a controlled speed past a destination. After the destination is achieved, the mover returns to the starting position or proceeds to a new destination.

Often, a track may include multiple branches joined together by switches that allow the movers to move between the branches. The process of controlling the switches, and hence routing the movers, may be performed by the central controller which has knowledge of the track topology and can track the location of the movers to provide signals to the switches. Current and anticipated independent cart systems may have hundreds of movers operating at high speed and requiring rapid routing decisions at switches, a process that can severely tax the central controller's ability to monitor the position and determine the necessary routing of each of the movers.

Thus, it would be desirable to provide an improved system for routing movers in tracks having complex topologies with many movers.

BRIEF DESCRIPTION

In one embodiment, the invention provides a system for controlling movers in a linear drive system having a plurality of movers associated with mover records and having a track providing a plurality of segments along which the movers may travel, each segment holding at least one electrically controllable driver coil and a segment controller executing a stored program to energize and deenergize the at least one driver coil for movement of the movers on the segment; wherein at least some of the segments include a switch forming branches between segments to provide switchably controllable alternate routes for the movers. The segment controllers operate to: (a) circulate mover records among the segment controllers according to physical proximity of a given mover associated with a given record to a given segment controller; and (b) at each segment controller associated with a switch, control a switch position according to a data of the mover record and its presence at a track of the segment controller.

According to another embodiment of the invention, a system for controlling movers in a linear drive system includes a plurality of movers and a track providing a plurality of segments along which the movers may travel, each segment holding driver coils and a segment controller controlling the driver coils for movement of the movers on the segment and some of the segments having switches forming branches between segments. A central controller communicates with the segment controllers and the segment controllers and central controller operate together to route the movers along the track by distributing routing decisions for a given mover to a segment controller for a track on which a given mover is currently traveling.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
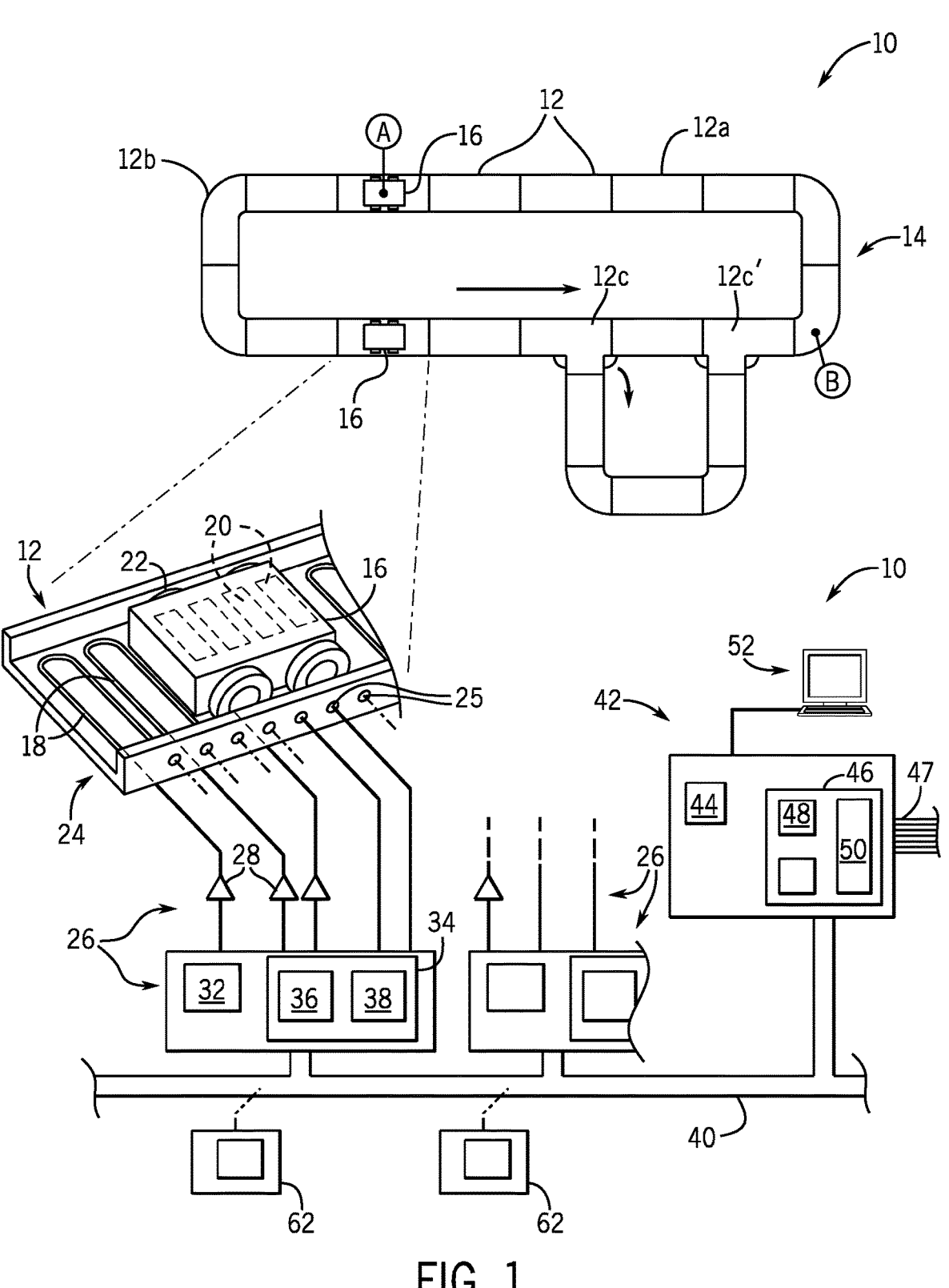
FIG. 1 is a top plan view of an exemplary Independent Cart Technology (ICT) track having track segments providing switches to create separate loops, FIG. 1 further providing an exploded fragmentary perspective view of a mover and a schematic representation of track controllers associated with each track segment showing a bus structure intercommunicating between different track controllers and a central controller, the bus structure used to pass mover records synchronized to the locations of the movers.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The present invention recognizes that the track controllers associated with each track section provide a simple and intuitive method of distributing the processing demands of navigation, to both reduce the demand on the central processor for routing supervision and to reduce the demands on the communication bus between the track controller and the central controller or even between track controllers. Specific route information described by route listings can be off-loaded to a mover record or specific track controllers allowing self-navigation of the movers on the tracks without necessary intervention of the central controller.

Referring now to FIG. 1, an independent cart technology (ICT) system 10 may provide a set of track segments 12 including, for example, straight segments 12*a*, curved segments 12*b*, and switch segments 12*c* which may be assembled, in one example, into a track 14 providing multiple loops joined at respective switch segments 12*c* and 12*c'*.

A set of movers 16 may be positioned on the track 14 to move, for example, between a starting position (A) and a destination position (B) each being arbitrarily designated by an application program according to a particular application of the ICT system 10 and as will be described below.

Generally each of the track segments 12 will function as a stator of a linear motor having a set of electromagnetic coils 18 spaced along an extent of the track segment 12 interacting with permanent magnets 20 or a similar salient structure within the mover 16. In this regard the mover 16 acts like a motor "rotor" to be moved or positioned by the selected energization of the coils 18. When permanent magnets 20 are employed, they may be arranged with alternating polarity and rotation to form a so-called Halbach array to better interact with the magnetic fields generated by the coils 18 in which generally magnetic axes are directed toward the mover 16.

Each track segment 12 may also include multiple sensors 25, for example, Hall effect sensors, magneto-diodes, an anisotropic magnetoresistive (AMR) device, fluxgate sensor, or other devices operating to generate an electrical signal corresponding to the presence of a magnetic field. The sensors allow the position of the mover 16 to be determined to provide for feedback control of mover motion. In one embodiment, the cart may be supported mechanically by rollers 22 held within a guide channel 24 of the track segment 12 and may be constrained laterally to stay on the track, for example, by a retaining wall on the track segment 12 or other guides.

Each track segment 12 may be associated with a segment controller 26 providing a set of electrical switches 28 for controlling the current to the coils 18 according to a desired sequencing of the coils 18 for moving or positioning the mover 16, for example, making use of position information from the sensors 25 in a feedback loop or the like allowing precise motion profiles in acceleration and deceleration, rapid stopping, collision detection and the like to be implemented by the segment controller 26 on a local basis. The electrical switches 28 may be solid-state devices including, but not limited to, transistors, thyristors, or silicon-controlled rectifiers.

In order to properly sequence the switches 28 to move or position the mover 16, the segment controller 26, for example, may include one or more processing elements 32 communicating via interface circuitry (not shown) with the switches 28 and the sensors 25. The processing elements 32 may further communicate with an electronic memory 34 holding an operating program 36 and data files 38 whose operations will be discussed below. Multiple segment controllers (e.g., 26, 26') associated with different segments 12 may intercommunicate by an electronic data bus 40, for example, using the Ethernet protocol for the transmission of electronic data whose structure as will be discussed in greater detail below.

The bus 40 may also communicate with a central controller 42, for example, having one or more processors 44 communicating with its own electronic memory 46 holding an operating program 48 and various data files 50 for the configuration and supervision of the ICT system 10. In this regard, the central controller 42 may communicate with a user terminal 52 (for example, including a graphics monitor, keyboard, mouse or the like) to allow a programming and configuration of the ICT system 10 including, for example, defining the various destinations and starting points of the movers 16. In addition, the central controller 42 may receive position information to monitor cart traffic and may provide programming rules and motion profiles to the segment controllers 26; however, the central controller 42 will generally not handle the instantaneous control of the mover 16 with respect to implementing motion profile or collision detection. In some embodiments, the central controller 42 may be a programmable logic controller (PLC) configured to control other elements of a process line integrated with the ICT system 10 and in this respect may provide I/O lines 47, for example, controlling actuators such as pneumatic or magnetic actuators or motors for receiving the sensor signals, for example, from limit switches, cameras, temperature monitors, and the like.

It will be appreciated that the ICT system 10 is fundamentally modular, allowing track segments 12 to be assembled together for a variety of topologies and the segment controllers 26 associated with each track segment 12 interconnected by the bus 40. This is in keeping with the fact that the ICT system 10 is intended to work in a variety of manufacturing and production environments.

Elements of the above described ICT technology 10, suitable for use with the present invention are commercially available from Rockwell Automation, Inc having offices throughout the world under the trade names of MagneMover and QuickStick and are described in multiple US and international patents assigned to the assignee of the present application and hereby incorporated by reference including US patent applications 2021/0213984 and 2020/0379439 and U.S. Pat. Nos. 10,985,685 and 11,190,086.

Figures 2, 3, 4:
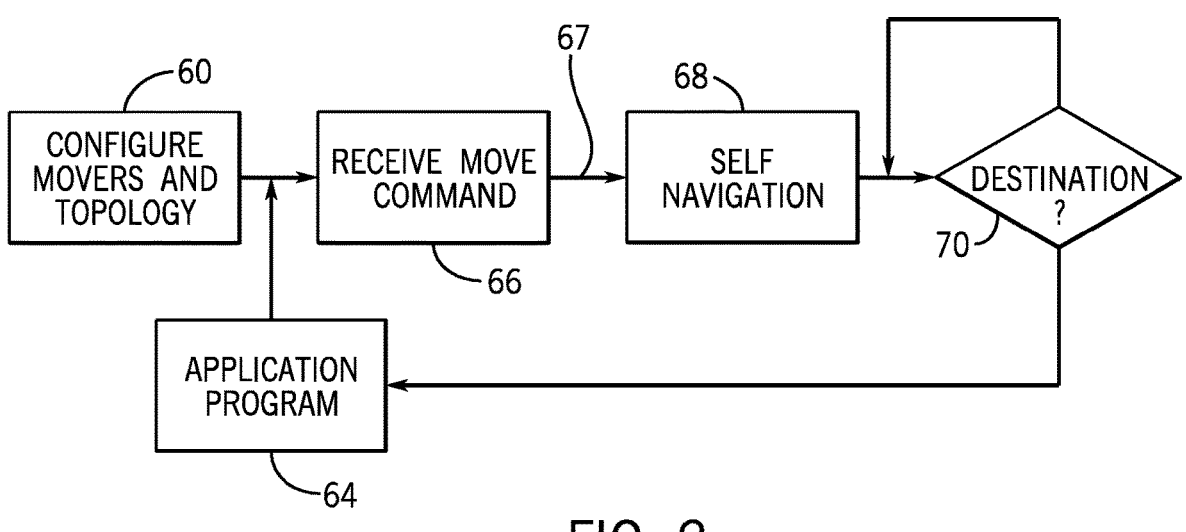
FIG. 2 is a flowchart showing the operation of the track of FIG. 1 implemented by the track controllers and the central controller.
FIG. 3 is a data structure diagram showing a first embodiment in which routing information for given destinations is held by the track controllers.
FIG. 4 is a data structure diagram showing a second embodiment in which routing information for given switches is held by the mover record.

Referring now also to FIG. 2, per process block 60, in operation, use of the ICT system 10 may begin with a configuration step in which the topology of the ICT system 10 is entered into the central controller 42, for example, as a file describing each segment 12 in order and their interconnections and providing an address for each segment controller 26 associated with the listed segments. For example, the mapping may be implemented as a table, graph or linked list identifying each segment 12 its neighbors, branches, and the like as well as the length of the segment 12.

As part of this process, the particular destinations A and B may be identified either as absolute positions on a given segment 12 or as a distance along a path, where a path is a contiguous length of track between two switches and identified by a path ID. For example, the track of FIG. 1 provides for three different paths. In this case, the destination location is given as a distance on a given path measured from the upstream end of the path to the destination. This latter path formulation may be chosen to provide a more compact storage of destination information as will be discussed below, because all destinations on a path can be routed with a single path ID. In all cases, the distance between destinations A and B may be readily determined from this mapping information.

In addition, at this time, the number of movers 16 is entered and unique identifiers assigned to the movers 16. In this latter step, the movers made be circulated around the track 14, for example, past an RFID tag reader so that each mover 16 may be given a unique identification number retained in association with that mover 16 by a persistent tracking of the mover 16 after configuration. In the same way, each mover 16 will be assigned to a mover record 62 that will pass along the bus 40 in synchrony with a respective mover 16 to effectively carry information associated with the mover 16 to the various track controllers 26.

This approach eliminates any need for electronics on the mover 16, such as data memory, to hold the data of the mover record 62, greatly simplifying the movers 16 and increasing their versatility; however, it will be appreciated that in an alternate embodiment the mover record 62 may be held all or in part on the mover 16 as a data file, for example, using wireless communication of that information to the proximate segment controller 26 or even directly to the bus 40 for the central controller 42. After or contemporaneously with the configuration process of process block 60, an application program 64 may be loaded into the central controller 42 describing the desired operation of the movers 16 in a particular application, for example, for manufactured product. As is generally understood in the art, the invention contemplates being used with a variety of different manufacturing processes (e.g., packaging, manufacturing, and machining) and in this respect anticipates user developed programs that will provide high-level commands to the movers 16 as the process dictates and will generally be developed specifically for an application. The application program 64 may communicate via an ICT program portion 66 a set of movement commands 67 each identifying particular movers 16 and may communicate over the bus 40 to either directly or via the mover record 62 with a given segment controller 26 having responsibility for the mover 16, generally determined by whether the mover is on the track segment 12 associated with the segment controller 26.

In one embodiment, these commands are implemented by modifying the mover records 62 of the mover 16 by writing a destination value being a location to which the movers 16 should move. This approach (as with the other approaches that will be described) allows a "set and forget" mode of operation in which the central controller 42, after issuing the move command, may relinquish control of the mover 16 until the mover 16 reaches the destination. In this way, traffic on the bus 40 is greatly reduced compared to what would otherwise be required if constant communication from the central controller 42 were required. In addition, the processing power necessary to route the movers 16 is automatically distributed to the multiple segment controllers 26 in a simple and intuitive way, with the position of the movers 16 serving as a proxy for how processing should be shared. This proxy sharing approach also assures that any given segment controller 26 is not overloaded by virtue of the limitations of the maximum density of the number of movers 16 that can be on a given track segment associated with that segment controller 26 and requiring routing.

Referring still to FIG. 2, using instruction information from the application program 60, sent directly to the segment controllers 26 and/or indirectly to the segment controllers 26 via the mover record 62, the segment controllers 26 automatically move the movers 16 to the destination as indicated by process block 68 as will be discussed in more detail below. Once a destination is reached, as determined by decision block 70 a signal may be communicated over the bus 40 to the central controller 42 and the application program 64 to trigger a new instruction. Typically, an arrival at the destination will be determined by the segment controller 26 having a track segment 12 embracing the indicated destination location.

Referring now to FIGS. 2 and 3, in a first embodiment, the set-and-forget instruction 67 per process block 68 loads the mover record 62 for the particular mover 16 (per its unique identifier 71 established during configuration) with the mover's currents destination 73, for example, identified as a particular track segment 12 and location on the track segment 12. In this case, the segment controllers 26 each include a destination-specific routing table 74 that may be received at the time of configuration 60 and thereafter can remain unchanged during the operation of the ICT system 10 with the exception of managing traffic problems as will be discussed below. This routing table 74, will provide a logical table linking each possible mover destination (as indicated by a first column) to a switch state or switch position determining the direction which determines the direction in which the mover 16 will be routed to reach that destination (indicated in simplified form as "left" or "right"). Using the routing table 74, each segment controller 26 identifies the destination of the mover 16 from the mover record 62 and sets the switch state on the associated track segment 12 to move the switch to the correct position to route the mover 16 to its indicated destination. Because the processing required by the central controller 42 for this routing is in most cases limited to the configuration step 60, the time that otherwise would be devoted to routing by the central controller 42 can be used for other tasks, for example, sophisticated routing algorithms that predict or simulate movement of other movers 16 to prevent congestion or minimize distance or acceleration and deceleration required by the mover 16 and the like.

Also at the time of configuration 60, each segment controller 26 may receive a destination location table 75 providing a list of destinations, typically only for destinations on the track segment 12 of the segment controller 26 and proximate to that segment controller 26, and listing either distance to that destination or absolute location of that destination from which distance can be derived. The destination location table 75 allows for motion control by the segment controllers 26 by providing the distance to the destination necessary for deceleration and absolute destination location to determine where the mover 16 stops. This information changes, typically, only if destination changes but can be used when there is rerouting in a detour, for example, without involvement of the central controller 42.

Thus, although the present system eliminates the need for the central controller 42 to be involved in routing, the central controller 42 may nevertheless receive information about the mover positions, for example, at a modest update rate below that which would be required for real-time control of the movers 16. This low-bandwidth information allows the central controller 42 to assess traffic conditions, and in response to that assessment, the central controller 42 updates the routing table 74 appropriately to manage traffic at a high level. The management of traffic is particularly helpful when there are parallel paths between destinations and for that reason traffic can be routed to reduce congestion. At other times, the segment controllers 26 use their operating program 36 to handle routing decisions as well as the intercommunication between the segment controllers 26 and adjacent segment controllers 26 for handing off control of the movers 16 as they travel between segments 12 and to manage motion control including, for example, acceleration, deceleration, and braking with a tight feedback loop with sensors 25 and coils 18.

Referring now to FIG. 4, in an alternative embodiment, the routing instructions 67 may be implemented as a switch-specific routing table 74 in the mover record 62 as opposed to the segment controller. This routing table 74 provides a first logical column identifying a switch on the ICT system 10, and a second logical column indicates a switch state (shown generically as left or right) needed to route the particular mover 16 associated with this mover record 62 to its intended destination. In this case, the segment controller 26 requires only a simple rules-based program that identifies each mover 16 from the mover ID 71 in the mover record 62 per process block 76, identifies itself (as a switch) in the routing table 74 to determine the correct switch state for the mover 16 from the switch routing table 74 per process block 78, and then controls the switch to move the mover 16 in the indicated direction per process block 80. An advantage to this approach is that the routing requires only a writing to the mover record 62 of the intended mover 16 by the central controller 42 at the time of issuance of instruction per process block 66 without the need to update the programming of each segment controller 26. The ability of the central controller 42 to quickly change the routing of movers 16 to handle traffic control issues is largely unaffected to the extent that destinations can be changed in the mover record 62 at any time.

Figure 5:
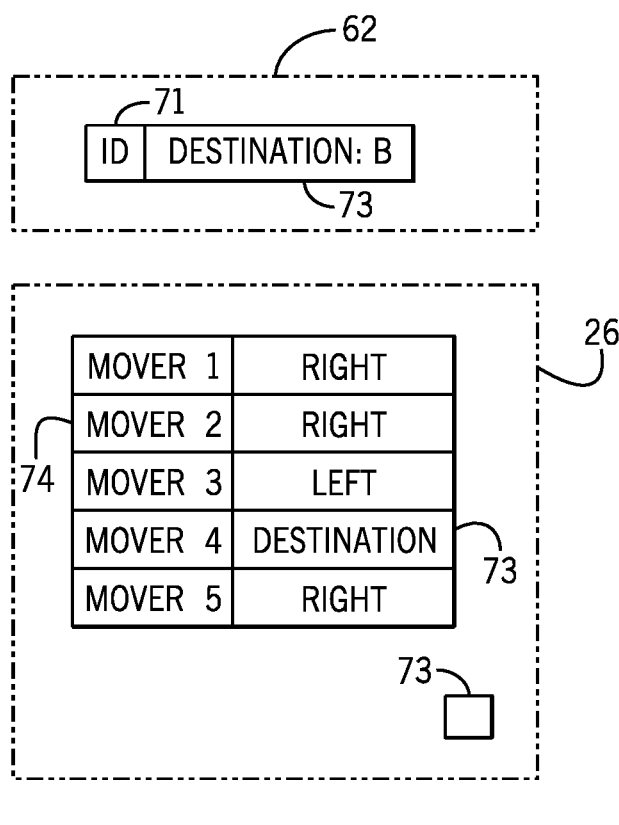
FIG. 5 is a data structure diagram showing a third embodiment in which routing information for each mover is held by the track controllers.

Referring now to FIG. 5, in an alternative embodiment, the routing table 74 is implemented as a mover-specific routing table 74 held in the segment controllers 26 in which a first logical column indicates a mover 16 on the ICT system 10 per the mover ID 71 and the second logical column indicates a switch state (shown generically as left or right). In this case, each segment controller 26 reads the mover identification 71 from an arriving mover record 62 of the physically arriving mover 16 and controls its associated switch according to the linked switch state in the routing table 74. This approach greatly simplifies the mover record 62, requiring as little as a mover ID 71, raising the possibility that this information can be contained in an RFID tag or the like without the need to transmit an extensive mover record 62. Again the ability of the central controller 42 to quickly handle traffic control issues is largely unaffected to the extent that routing table 74 can be changed dynamically during the routing process. Segment controllers 26 associate with track segments 12 having a destination will indicate that destination 73 in the routing table 74 in order to provide a destination identification per decision block 70 of FIG. 2. In this respect for all of the embodiments described, the segment controllers 26 without associated switches will provide information or use information necessary to identify destinations.

The use of destination information in routing the movers 16, as described above, allows for the implementation of a special "jog move" command in which the destination field contains a nonexistent destination or is left blank. In the example of FIG. 3, routing table 74 may be given a default routing for blank or nonexistent destinations, and in the example of FIG. 5, a switch position will be provided for that mover subject to a jog move command for all switches. When this instruction is implemented, the mover 16 will indefinitely circulate on the track until such time as a destination is entered, for example, allowing the mover 16 to avoid obstruction of other movers 16, when it is otherwise unutilized.

It will be recognized that generally the processors 32 and 44 and the memory device 34 and 46 may be implemented with a variety of different technologies including on a field programmable array (FPGA) or an application specific integrated circuit (ASIC). It is contemplated that the processors and memory may each be a single electronic device or formed from multiple devices. The memory device 34 may include volatile memory, non-volatile memory, or a combination thereof.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for controlling movers in a linear drive system, comprising:

a plurality of movers associated with mover records; and a track providing a plurality of segments along which the movers may travel, each segment holding at least one electrically controllable driver coil and a segment controller executing a stored program to energize and deenergize the at least one driver coil for movement of the movers on the segment; wherein at least some of the segments are switch segments forming branches between segments, wherein each switch segment is selectively controllable to direct each of the plurality of movers along either a first route or a second route;

the segment controllers operative to:

(a) circulate mover records among the segment controllers according to physical proximity of a given mover associated with a given record to a given segment controller; and (b) at each segment controller associated with one of the switch segments, control a switch position to selectively direct each of the plurality of movers along either the first route or the second route according to a data of the mover record corresponding to each of the plurality of movers and its presence at the segment controller corresponding to the switch segment, wherein the data corresponds to a desired destination of the mover.

2. The system of claim 1 wherein the data of the mover records holds mover destinations and wherein the segment controllers associated with switch segments further hold route listings linking mover destinations to switch positions and control the switch segments according to mover destinations in the mover record of movers present at the switch segment.

3. The system of claim 1 wherein the data of the mover records holds route listings linking switch segments to switch positions for the associated mover and wherein a given segment controller associated with a switch segment controls the switch segment according to the switch positions linked to the switch of the given segment controller in the mover records of movers present at the switch segment.

4. The system of claim 1 wherein the data of the mover records holds mover identification and wherein the segment controllers associated with switch segments further hold route listings linking movers to switch positions and control the switch segments according to mover identification in the mover record of movers present at the switch segment.

5. The system of claim 1 further including a central controller communicating with each of the segment controllers to provide a route listing describing mover routes and triggered by an arrival of the mover at a destination of a previous route listing.

6. The system of claim 1 further including a central controller communicating with each of the segment controllers to provide the mover records for the movers triggered by an arrival of each mover at a destination of a previous mover record.

7. The system of claim 1 further including a central controller running an application program to generate control signals for equipment synchronized to an operation of the linear drive system and wherein the application program generates destinations of the movers.

8. The system of claim 1 further including a central controller receiving from the segment controllers mover location data to dynamically determine traffic flow and to change at least one of the mover records and route listings according to traffic flow.

9. The system of claim 1 further including an electronic communication bus allowing intercommunication between the segment controllers and wherein the mover record is a data structure communicated along the communication bus to a second segment controller from a first segment controller controlling the given mover.

10. The system of claim 1 wherein each segment controller associated with a switch segment holds the mover record of each mover present at the switch segment.

11. The system of claim 1 wherein each segment controller provides a list of mover destination providing information about a distance to that destination whereby motion control may be obtained without necessary intervention of the central controller.

12. A method of controlling movers in a linear drive system, comprising:

providing a plurality of movers, each mover associated with a mover record;

providing a track providing a plurality of segments along which the movers may travel, each segment holding at least one electrically controllable driver coil and a segment controller executing a stored program to energize and deenergize the at least one driver coil for movement of the movers on the segment; wherein at least some of the segments are switch segments forming branches between segments, wherein each switch segment is selectively controllable to direct each of the plurality of movers along either a first route or a second route;

circulating mover records among the segment controllers according to physical proximity of a given mover associated with a given record to a given segment controller; and at each segment controller associated with a switch, controlling a switch position to selectively direct each of the plurality of movers along either the first route or the second route according to a data of the mover record corresponding to each of the plurality of movers and its presence at the segment controller corresponding to the switch segment, wherein the data corresponds to a desired destination of the mover.

13. The method of claim 12 wherein the data of the mover records hold mover destinations and wherein the segment controllers associated with switch segments further hold route listings linking mover destinations to switch positions and control the switch segments according to mover destinations in the mover record of movers present at the switch segment.

14. The method of claim 12 wherein the data of the mover records hold route listings linking switch segments to switch positions for the associated mover and wherein a given segment controller associated with a switch segment controls the switch segment according to the switch positions linked to the switch of the given segment controller in the mover records of movers present at the switch segment track.

15. The method of claim 12 wherein the data of the mover records hold mover identification and wherein the segment controllers associated with switch segments further hold route listings linking movers to switch positions and control the switch segments according to mover identification in the mover record of movers present at the switch segment.

16. The method of claim 12 further including providing a central controller communicating with each of the segment controllers to provide the route listings triggered by an arrival of the mover at a destination of a previous route listing.

17. The method of claim 12 further including a central controller communicating with each of the segment controllers to provide the mover records for the movers triggered by an arrival of each mover at a destination of a previous mover record.

18. The method of claim 12 further including providing a central controller running an application program to generate control signals for equipment synchronized to the operation of the linear drive system and wherein the application program generates destinations of the movers.

19. The method of claim 12 further including providing a central controller receiving from the segment controllers mover location data to dynamically determine traffic flow and to change at least one of the mover records and route listings according to traffic flow.

20. A system for controlling movers in a linear drive system, comprising:

a plurality of movers;

a track providing a plurality of segments along which the movers may travel, each segment holding at least one electrically controllable driver coil and a segment controller executing a stored program to energize and deenergize the at least one driver coil for movement of the movers on the segment; wherein at least some of the segments are switch segments forming branches between segments, wherein each switch segment is selectively controllable to direct each of the plurality of movers along either a first route or a second route; and a central controller communicating mover records with the segment controllers, wherein the segment controllers and central controller operate together to route the movers along the track by distributing routing decisions within the mover records for a given mover to a segment controller for a track segment on which a given mover is currently traveling, and wherein a segment controller associated with one of the switch segments on which a mover is present is operative to control a switch position to selectively direct the mover along either the first route or the second route according to the routing decisions within the mover records.

* * * * *